US012783962B1

(12) United States Patent
Xiang et al.

(10) Patent No.: US 12,783,962 B1
(45) Date of Patent: Nov. 3, 2026

(54) CALIBRATING COMPUTING MODELS TO GENERATE COMPUTING OUTPUT DATA FOR A TARGET COMMUNICATION IN A COMPUTING NETWORK

(71) Applicant: THE TRADE DESK, INC., Ventura, CA (US)

(72) Inventors: Liu Xiang, Shanghai (CN); Chuanxi Wang, Shanghai (CN); Yichao Peng, Shanghai (CN); Shutong Chen, Shanghai (CN)

(73) Assignee: The Trade Desk, Inc., Ventura, CA (US)

( * ) Notice: Subject to any disclaimer, the term of this patent is extended or adjusted under 35 U.S.C. 154(b) by 0 days.

(21) Appl. No.: 19/384,629

(22) Filed: Nov. 10, 2025

(30) Foreign Application Priority Data

Sep. 25, 2025 (CN) ......................... 202511378080.9

(51) Int. Cl.
*G06N 20/00* (2019.01)
*G06F 17/40* (2006.01)

(52) U.S. Cl.
CPC ............. *G06N 20/00* (2019.01); *G06F 17/40* (2013.01)

(58) Field of Classification Search
None
See application file for complete search history.

(56) References Cited

U.S. PATENT DOCUMENTS

2026/0025322 A1* 1/2026 Wang ...................... H04L 41/16

* cited by examiner

*Primary Examiner* — David R Vincent
(74) *Attorney, Agent, or Firm* — Baker & McKenzie LLP

(57) ABSTRACT

The disclosed methods and systems are directed to: generating a first calibrated computing model and a second calibrated computing model based on a first configured computing model and a second configured computing model, respectively; generating, based on the first calibrated computing model, first output data comprising: a first probability of executing a first computing operation on a first computing device, and first yield data quantifying a first outcome of executing the first computing operation on the first computing device; and generating, using the second calibrated computing model, second computing output data comprising: a second probability of executing a second computing operation on the first computing device or a second computing device in response to the first computing device or the second computing device, and second yield data quantifying a second outcome of executing the second computing operation on the first computing device or the second computing device.

20 Claims, 7 Drawing Sheets

CALIBRATING COMPUTING MODELS TO GENERATE COMPUTING OUTPUT DATA FOR A TARGET COMMUNICATION IN A COMPUTING NETWORK

BACKGROUND

There is a need for executing computing operations across multiple dimensions.

SUMMARY

This disclosure is directed to methods, systems, and computer program products for generating computing output data for a target communication in a computing network. According to an embodiment, a method for generating computing output data for a target communication comprises: receiving first request data associated with a first target communication and a first communication category; receiving second request data associated with a second target communication and a second communication category; generating, based on the first request data, first training data associated with the first communication category; generating, based on the second request data, second training data associated with the second communication category; accessing a first computing model; accessing a second computing model; implementing a first training computing operation, based on the first training data, on the first computing model, thereby generating a first trained computing model, wherein the first training computing operation is not based on the second training data; implementing a second training computing operation, based on the second training data, on the second computing model, thereby generating a second trained computing model, wherein the second training computing operation is not based on the first training data; implementing a third training computing operation, based on the first trained computing model and the first communication category, thereby generating a third trained computing model; implementing a fourth training computing operation, based on the second trained computing model and the second communication category, thereby generating a fourth trained computing model; determining a first model evaluator associated with the first trained computing model and the third trained computing model; determining a second model evaluator associated with the second trained computing model or the fourth trained computing model; implement a first balancing, based on the first model evaluator, a first data prediction generated using the first trained computing model with a second data prediction generated using the third trained computing model; implement a second balancing, based on the second model evaluator, a third data prediction generated using the second trained computing model with a fourth data prediction generated using the fourth trained computing model, wherein: the first model evaluator is based on a first loss function configured to determine first classification loss data associated with the first data prediction relative to first regression loss data associated with the second data prediction; and the second model evaluator is based on a second loss function configured to determine second classification loss data associated with the third data prediction relative to second regression loss data associated with the fourth data prediction; generating, based on the first balancing, a first configured computing model; generating, based on the second balancing, a second configured computing model; receiving third request data associated with a third target communication; receiving fourth request data associated with a fourth target communication; applying the third request data to the first configured computing model, thereby generating first predictive data; applying the fourth request data to the second configured computing model, thereby generating second predictive data; determining, based on the first predictive data, a first data distribution; determining, based on the second predictive data, a second data distribution; calibrating, based on the first data distribution, the first configured computing model, thereby generating a first calibrated computing model; calibrating, based on the second data distribution, the second configured computing model, thereby generating a second calibrated computing model; applying fifth request data to the first calibrated computing model thereby generating first computing output data for a fifth target communication, the first computing output data comprising: a first probability of executing a first computing operation on a first computing device in response to the first computing device receiving the fifth target communication, and first yield data quantifying a first outcome of executing the first computing operation on the first computing device; applying sixth request data to the second calibrated computing model thereby generating second computing output data for a sixth target communication, the second computing output data comprising: a second probability of executing a second computing operation on the first computing device or a second computing device in response to the first computing device or the second computing device receiving the sixth target communication, and second yield data quantifying a second outcome of executing the second computing operation on the first computing device or the second computing device; applying, to the first calibrated computing model, a first regression area under a curve (AUC) evaluator to measure a first accuracy of the first computing output data, wherein the first computing output data is associated with a first asymmetric error tolerance data of the first calibrated computing model; applying, to the second calibrated computing model, a second regression AUC evaluator to measure a second accuracy of the second computing output data, wherein the second computing output data is associated with a second asymmetric error tolerance data of the second calibrated computing model; formatting the first computing output data thereby generating a first multidimensional report; formatting the second computing output data thereby generating a second multidimensional report; transmitting the first multidimensional report to a third computing device; transmitting the second multidimensional report to a fourth computing device; and initiate visualizing: the first multidimensional report on the third computing device, and the second multidimensional report on the fourth computing device.

These and other implementations may each optionally include one or more of the following features.

According to one embodiment, generating the first training data comprises: transforming, using a hash computing operation and a modulus computing operation, a first data segment comprised in the first request data, thereby generating first transformed data; the generating the second training data comprises transforming, using a sine or cosine computing operation, a second data segment comprised in the first request data, thereby generating second transformed data; the first training data comprises a first combination of the first transformed data and the second transformed data; and the second training data comprises a second combination of the first transformed data and the second transformed data.

Furthermore, the first data segment comprises one or more of: a data format of the first target communication;

platform data for a first target platform associated with the first computing device and through which the first target communication is delivered to the first computing device; device data for a device type associated with the first computing device; operating system data for an operating system type associated with the first computing device; media driver identifier data associated with the first request data; jurisdiction data associated with the first request data; zip code data associated with the first request data; communication language data associated with the first request data; rendering context data associated with the first request data; browser data associated with the first request data; communication connection type associated with the first request data; location data on a display device of the first computing device at which the first target communication is displayed; contextual communication group data associated with the first target communication; communication origination identifier data associated with the first target communication; communication identifier associated with the first target communication; and identifier data associated with the first communication category. According to one embodiment, the second data segment is associated with, or comprises one or more of: timestamp data of a timestamp associated with when the first request data is received; temporal window data associated with a timeframe within which at least the first target communication or the sixth target communication is delivered to at least the first computing device; first time unit data associated with when at least the first target communication or the sixth target communication is transmitted or delivered to the first computing device; second time unit data associated with a frequency of transmitting at least the first target communication or the sixth target communication to the first computing device; and latitude or longitude data associated with a location of the first computing device.

Furthermore, the first model evaluator can be configured to determine by how much: the first trained computing model deviates in predicting substantially accurate data values; and the third trained computing model deviates in predicting substantially accurate data values. Moreover, the second model evaluator can be configured to determine by how much: the second trained computing model deviates in predicting substantially accurate data values; and the fourth trained computing model deviates in predicting substantially accurate data values.

It is appreciated that calibrating, based on the first data distribution, the first configured computing model, thereby generating the first calibrated computing model comprises tuning the first configured computing model to normalize first data outputs generated by the first calibrated computing model, thereby generating first normalized data outputs, the first normalized data outputs comprising the first computing output data. It is further appreciated that the calibrating, based on the second data distribution, the second configured computing model, thereby generating the second calibrated computing model comprises tuning the second configured computing model to normalize second data outputs generated by the second calibrated computing model, thereby generating second normalized data outputs, the second normalized data outputs comprising the second computing output data.

According to one embodiment, the first computing output data comprises a first quantitative data vector associated with: the first probability of executing the first computing operation on the first computing device in response to the first computing device receiving the fifth target communication; and the first yield data quantifying the first outcome of executing the first computing operation on the first computing device. Furthermore, the second computing output data comprises a second quantitative data vector associated with: the second probability of executing the second computing operation on the second computing device in response to the second computing device receiving the sixth target communication; and the second yield data quantifying the second outcome of executing the second computing operation on the second computing device.

In exemplary implementations, the fifth request data is associated with a first request for displaying the fifth target communication via a first computing platform associated with the first computing device or the second computing device; and the sixth request data is associated with a second request for displaying the sixth target communication via a second computing platform associated with the first computing device, the second computing device, or a fifth computing device.

Furthermore, the first target communication comprises one or more of first textual data, first image data, first video data, or first audio-visual data. Similarly the second target communication comprises one or more of second textual data, second image data, second video data, or second audio-visual data. In addition, the third target communication can comprise one or more of third textual data, third image data, third video data, or third audio-visual data. Moreover, the fourth target communication can comprise one or more of fourth textual data, fourth image data, fourth video data, or fourth audio-visual data. Furthermore, the fifth target communication can comprise one or more of fifth textual data, fifth image data, fifth video data, or fifth audio-visual data while the sixth target communication comprises one or more of sixth textual data, sixth image data, sixth video data, or sixth audio-visual data.

It is appreciated that the first computing platform comprises a first webpage while the second computing platform comprises a second webpage.

In some implementations: the first request data comprises a first data category to which the first target communication belongs; the second request data comprises a second data category to which the second target communication belongs; and the third request data comprises a third data category to which the third target communication belongs.

In some cases, the fifth target communication comprises a first technical artifact or a first computing process including a first textual graphic or a first image graphic or a first video graphic that can be rendered on the first computing device while the sixth target communication comprises a second technical artifact or a second computing process including a second textual graphic or a second image graphic or a second video graphic that can be rendered on the second computing device or a fifth computing device.

According to one embodiment: the first computing output data comprises a first quantifiable measurement associated with at least the fifth target communication on at least the second computing device; and the second computing output data comprises a second quantifiable measurement associated with at least the sixth target communication on at least the second computing device.

Additionally, the first regression AUC evaluator is configured to determine first ordering data of the first calibrated computing model relative to a first validated data prediction associated with the first calibrated computing model.

Similarly, the second regression AUC evaluator is configured to determine second ordering data of the second calibrated computing model relative to a second validated data prediction associated with the second calibrated computing model.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

The figures and descriptions provided have been simplified to illustrate aspects that are relevant for a clear understanding of the described devices, systems, and methods, while eliminating, for the purpose of clarity, other aspects that may be found in typical similar devices, systems, and methods.

System Environment

Figure 1:
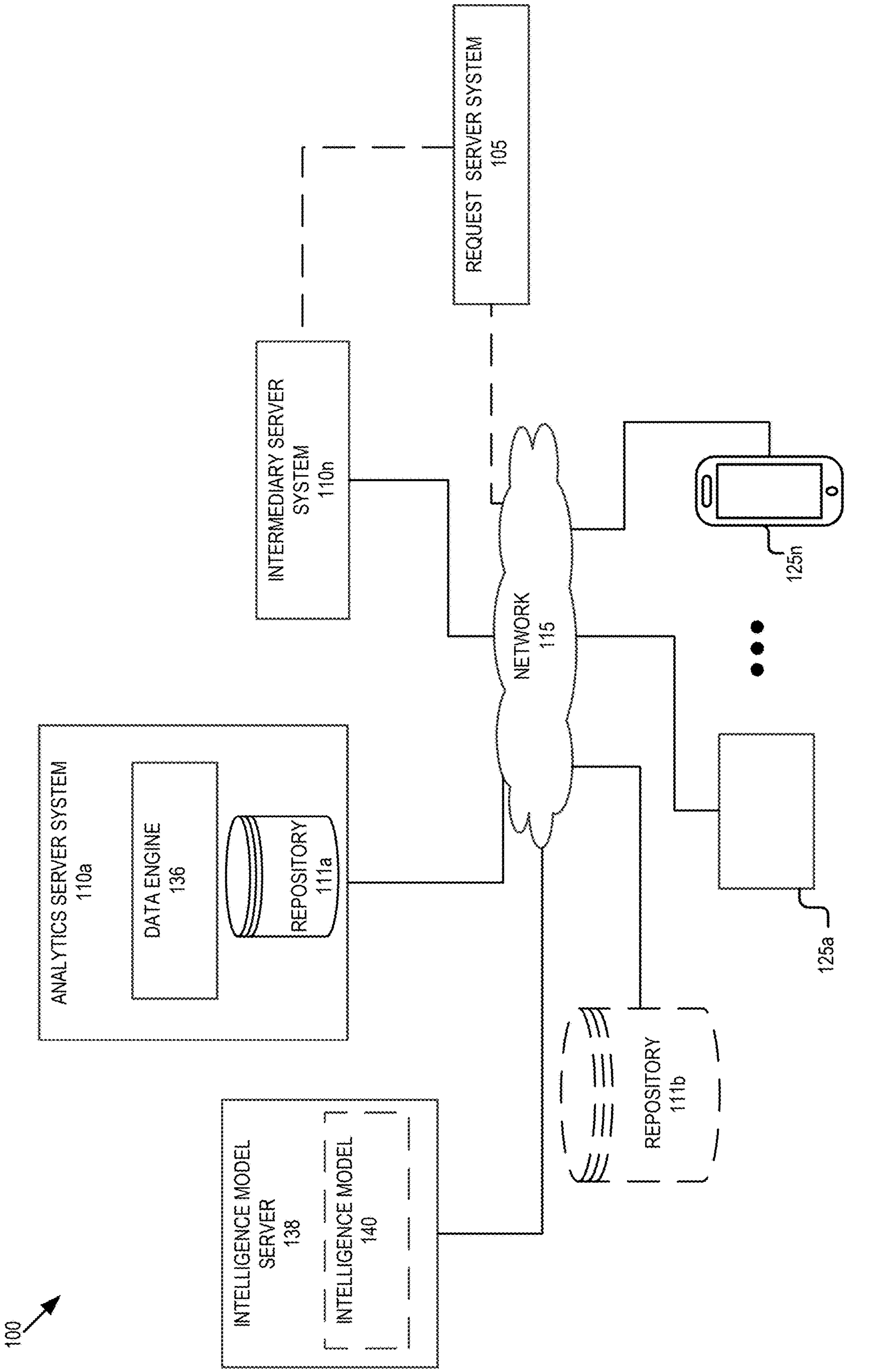
FIG. 1 shows an exemplary network system for generating computing output data for a target communication in a computing network.

Illustrated in FIG. 1 is an exemplary network system 100 for executing the principles disclosed. In the illustrated implementation, the network system 100 may include a request server system 105 communicatively coupled to an analytics server system 110*a*, an intermediary server system 110*n*, and to one or more target computing systems 125*a*, . . . , 125*n* via a network 115. While a single request server system 105 is illustrated, the disclosed principles and techniques can be expanded to include multiple analytic server systems. Similarly, the disclosed methods and systems can be expanded to include multiple analytic server systems and multiple intermediary server systems as the case may require.

The request server system 105 may be configured to transmit, for example, one or more request data associated with one or more data communications to the analytics server system 110*a*. This can be done directly via the network 115 or indirectly via the intermediary server system 110*n*. The one or more request data can comprise a programmatic message that is formatted as a JavaScript Object Notation (JSON) data object or similar data objects (e.g., an Extensible Markup Language (XML) data object, a YAML Ain't Markup Language (YAML) data object, a Comma Separated Values (CSV) data object, a Protocol Buffer (protobuf) data object, etc.) initiated on the request server system 105. It is appreciated that the request server system 105 can comprise a supply-side platform (SSP) and/or a data communication exchange platform. In some cases, the one or more request data can comprise: one or more data categories associated with a computing platform (e.g., a website or an application or a computing service) for visualizing the one or more data communications; domain data associated with the one or more data communications; computing inventory/cache data associated with the one or more data communications; context data associated with a device type associated with the target computing systems 125*a* . . . 125*n*; geolocation data associated with where the target computing systems 125*a* . . . 125*n* are located; operating system type associated with the one or more target computing systems 125*a* . . . 125*n*; browser or application data associated with the one or more target computing systems 125*a* . . . 125*n*; quantitative data (e.g., maximum or minimum yield tolerance data) associated with the one or more data communications; communication data type (e.g., textual data, image data, video data, audio-video data) associated with the one or more data communications; byte size information quantifying a data size of the one or more data communications; identifier data associated with the one or more data communications; etc.

According to one embodiment, the request server system 105 includes a computing device such as a content server, a communication server, a laptop computer, a desktop computer, a handheld computing device, a tablet computing device, a virtual machine, a cloud-based computing system and/or a cloud-based service, and/or the like. The request server system 105 may include a plurality of computing devices configured to communicate with one another and/or communicate with other systems comprised in the network system 100 to implement the techniques described herein.

According to one embodiment, the intermediary server system 110*n* may comprise a data exchange platform configured to instantaneously coordinate data exchanges or data flow between the request server system 105 and the analytics server system 110*a*. In particular, the intermediary server system 110*n* may comprise a network platform that adaptively tracks and/or organizes and/or synchronizes one or more request data from the request server system 105 with the operations and/or data structures associated with the analytics server system 110*a* and thereby coordinate optimal target data communications to the one or more target computing systems. It is appreciated that the intermediary server system 110*n* can comprise a computing device such as a content server, a communication server, a laptop computer, a desktop computer, a handheld computing device, a tablet computing device, a virtual machine, a cloud-based computing system and/or a cloud-based service. The intermediary server system 110*n* may include a plurality of computing devices configured to communicate with one another and/or communicate with other systems comprised in the network system 100 to implement the techniques described herein.

The analytics server system 110*a* may include one or more computing systems that implement one or more of the disclosed techniques. According to one embodiment, the analytics server system 110*a* comprises a data engine 136 and at least one local data repository 111*a*. For example, results from implementing the disclosed methods may be stored in the local data repository 111*a* or in a remote data repository 111*b* that is physically distal (e.g., implemented in a first location that is different from a second location where the local data repository 111*a* is implemented. According to one embodiment, the local data repository 111*a* and the remote data repository 111*b* may include non-volatile memory or similar permanent storage device and media. For example, the local data repository 111*a* and the remote data repository 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

According to one embodiment, the analytics server 110*a* can be coupled, via the network 115, to an intelligence server 138 configured to control or regulate, in conjunction with, or independent of the data engine 136, training of one or more of the disclosed computing models such as the disclosed calibrated computing model. In some cases, the intelligence model server can train a given intelligence model 140 (e.g., first computing model, second computing model, third computing model, fourth computing model, calibrated computing model, etc.) using at least one of: zero-shot learning, few-shot learning, and fine-tuning. Additionally or alternatively, one or more of the disclosed intelligent models may comprise, or be based on at least one of: GPT-4, LLaMA-3, BLOOM, PaLM, GPT-3.5, BERT, Gemini, LaMDA, Perplexity, or Falcon.

Additionally or alternatively, one or more of the disclosed intelligent models may also include multiple intelligence models (e.g., separately trained intelligence models) and therefore may be configured to perform and/or execute multiple processes in parallel. The intelligence models disclosed herein may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally or alternatively, one or more of the disclosed models may also include multiple intelligence models (e.g., separately trained intelligence models) and therefore may be configured to perform and/or execute multiple processes in parallel. In some embodiments, the intelligence model server 138 may include a special chipset for processing large amounts data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence model server 138 and/or analytics system 110*a*. The chipsets referenced herein may further incorporate dedicated memory architectures (e.g., High Bandwidth Memory (HBM)) optimized for the data throughput requirements of large intelligence models.

In some embodiments, the disclosed intelligence model(s) 140, or components thereof, may be implemented and/or deployed on dedicated hardware accelerators embedded within a system-on-chip (SoC) or as discrete integrated circuits. These hardware implementations facilitate high-speed data processing and low-latency inference, needed for real-time applications. Furthermore, the intelligence model server 138, or components thereof, including the specialized chipsets and intelligence models, may be provided by a third-party vendor or service provider (e.g., via cloud-based AI/ML platforms) or may be developed and maintained in-house.

In some instances, the intelligence model server 138, or components thereof, including the specialized chipsets and intelligence models, may be directly integrated into the analytics server system 110*a* and is controlled by the data engine 136 comprised in the analytics server system 110*a*. This direct integration allows for optimized communication pathways, potentially reducing latency and enhancing data privacy by keeping sensitive data within the controlled computing environment of the analytics server 110*a*.

The network 115 indicated in FIG. 1 may include a plurality of networks. For instance, the network 115 may include any wired and/or wireless communication network that facilitates communication between the request server system 105, the analytics server system 110*a*, and the target computing systems 125*a*, . . . , 125*n*. The network 115, in some instances, may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

Turning back to FIG. 1, the target computing systems 125*a*, . . . , 125*n* may be handheld computing devices, smart phones, tablets, phablets, laptop computers, desktop computers, personal digital assistants (PDAs), smart devices, wearable electronic devices, biometric devices, computer servers, virtual servers, virtual machines, and/or communication servers. In some embodiments, the target computing systems 125*a*, . . . , 125*n* may include a plurality of computing devices configured to communicate with one another and/or receive/transmit data communications from/to the analytics server system 110*a* and/or the request server system 105 and/or the intermediary server 110*n*. It is appreciated that one or more target data communications associated with executing one or more of the disclosed methods may be visualized on one or more display devices of the target computing systems 125*a*, . . . , 125*n*.

Figure 2:
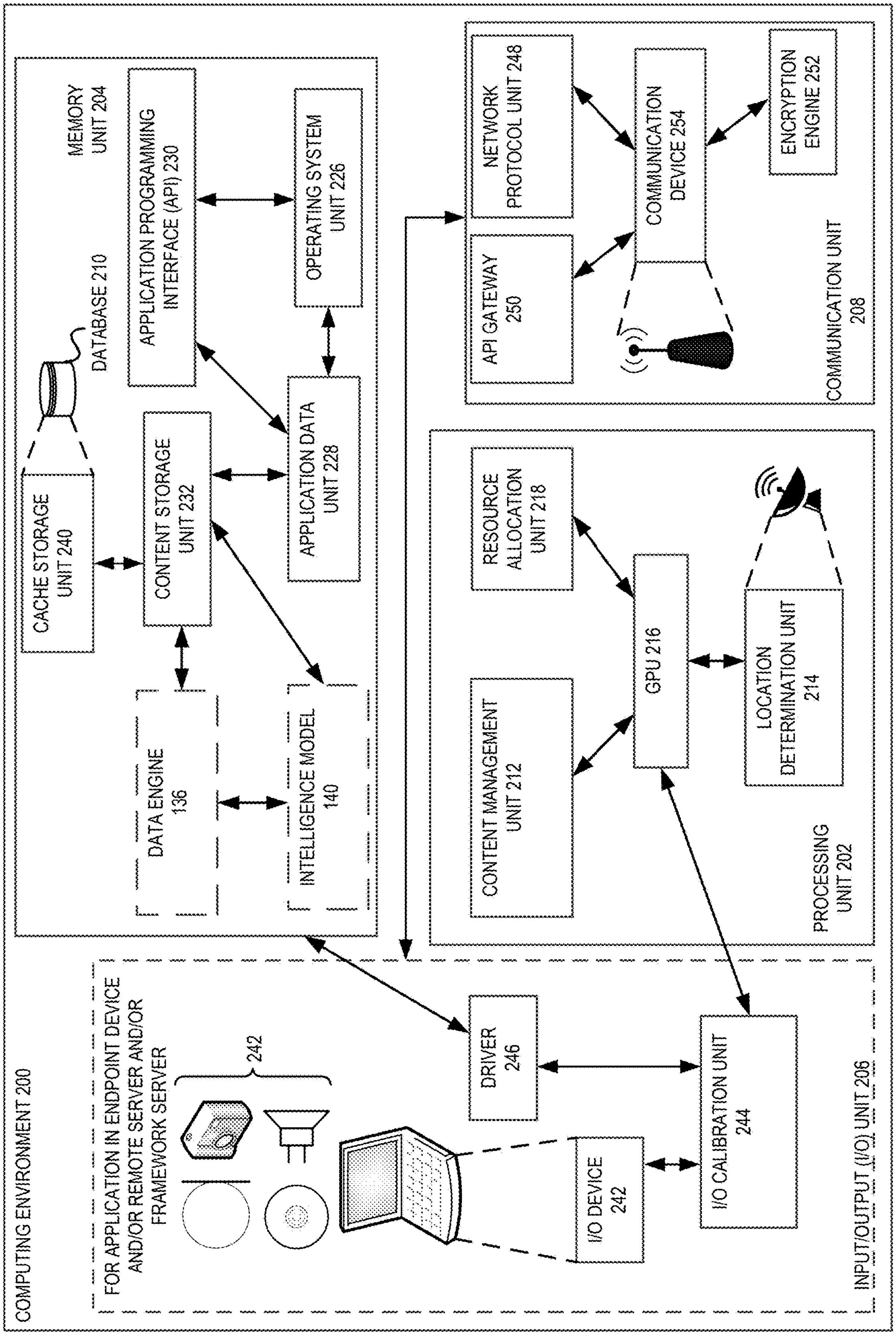
FIG. 2 illustrates a functional system diagram of a computing environment for implementing one or more subsystems of the network system of FIG. 1.

FIG. 2 illustrates a functional system diagram of a computing environment 200 which can be used to implement the various server systems and/or computing devices or computing systems referenced in FIG. 1 including the analytics server system 110*a*, the intermediary server 110*n*, the request server system 105, the target computing systems 125*a*, . . . , 125*n*, and the intelligence model server 138. The computing environment 200 and any units and/or subunits of FIG. 2 may be included in one or more elements of the system 100 as described in association with FIG. 1. The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115. The computing environment 200 may be implemented on general-purpose hardware and/or specifically-purposed hardware as the case may require.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display device or a graphical user interface (GUI) of a display device of the target computing system 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations of the computing environment 200. In some embodiments, the memory unit 204 may store instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data engine 136 associated with the analytics server system 110*a*. Furthermore, the memory unit 204 can also be used to store one or more of the disclosed models.

The memory unit 204 may include various types of data storage media such as solid state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random access memory (RAM) device, a dynamic random access memory (DRAM) device, a static random access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the storage repository 111*a* or storage repository 111*b* associated with the analytics server system 110*a*. In some embodiments, the memory unit 204 and/or its subunits may be local relative to the request server system 105 and/or the analytics server system 110*a* and/or remotely located relative to the request server system 105 and/or to the analytics server system 110*a*.

Turning back to FIG. 2, the memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data engine 136. The data engine 136 may be configured to implement one or more of the disclosed computing methods or operations. According to one embodiment, the data engine 136 comprises one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, a target computing system 125*a* may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the request server system 105 and/or the display device of the target computing system 125*a*, and/or the analytics server system 110*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files (e.g., media content, image data, video data, audio-visual data, visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input (e.g., request data)

from the request server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242, and then adjust and/or modify settings and/or format and/or optimize viewing of a graphical user interface and/or one or more visualizations associated request data and/or target data communications. According to some embodiments, the I/O calibration unit 244 may be used to format or resolve, for example, target data communications and/or request data into multidimensional data components and rendering the multidimensional data on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., request data and/or target data communications) between computing environment 200 and other computing environments, third party server systems, and/or the like. Communication unit 208 may also facilitate internal communications between various elements (e.g., units and/or subunits) of computing environment 200. In some embodiments, communication unit 208 may include a network protocol unit 248, an API gateway 250, an encryption engine 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption engine 252 may facilitate translation, encryption, encoding, decryption, and/or decoding of information received, transmitted, and/or stored by the computing environment 200. Using encryption engine 252, each transmission of data may be encrypted, encoded, and/or translated for security reasons, and any received data may be encrypted, encoded, and/or translated prior to its processing and/or storage. In some embodiments, encryption engine 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Embodiments

The disclosed methods and systems are directed to calibrating, using a multi-calibration computing process, a computing model to determine (e.g., probabilistically determine or estimate or predict or forecast) configuration parameters of a data communication(s). In particular, the configuration parameters can guide or otherwise inform a communication strategy for transmitting the aforementioned data communication(s). In exemplary implementations, the configuration data comprises first output data associated with implementing a computing operation on a computing device (e.g., target computing device) to which the data communication (s) is sent. The configuration data may further comprise second output data including yield data that quantifies an outcome (e.g., a computing outcome) in response to executing the computing operation on the computing device.

According to one embodiment, the first output data or second output data is associated with an interactive computational system (e.g., display device) comprised in the aforementioned computing device. In particular, the first output data or second output data can comprise a programmatic identification and statistical quantification of a graphic transition on the interactive computation system from a first state (e.g., an initial system state or interaction pattern) to a second state (e.g., predefined target system state) as determined by a series of logged interactions and system-state changes. This process can involve real-time or near real-time analysis of interaction event streams on the interactive computational system, where each event comprised in the event stream can include structured data comprising at least an identifier, an event type, a timestamp, and associated contextual parameters (e.g., source data (e.g., Uniform Resource Locator (URL) source data, elapsed time, input values). Furthermore, the first output data or second output data may be characterized by the satisfaction of a preconfigured logical computing condition set applied to the aforementioned event stream, such that the condition set specifies a sequence of atomic computing actions or operations, a set of system responses, or a change in profile attributes (e.g., from "unregistered" to "registered," or "Browse" to "interacting"). According to one embodiment, the disclosed methods and systems can employ state-machine logic or rule-based inference engines to detect the execution of these conditions, thereby triggering an increment of a data counter within a performance monitoring module of the disclosed systems (e.g., a request server system, an intermediary server system, or an analytics server system). This characterization further extends to the dynamic updating of computing models based on observed data pathways, enabling the disclosed systems to computationally optimize graphical interface elements, content delivery protocols, or notification triggers to increase or decrease a quantifiable output data indicative of the first output data or second output data. The quantifiable output data can comprise probability data indicating the likelihood of executing a computing operation on a computing device based on a data communication(s) sent to the computing device. This quantifiable output data can be a derived statistical metric calculated through a computationally intensive aggregation of event data indicative of data element transitions (e.g., computing state transitions) on a display device of the computing device over a specified period or temporal window. Specifically, the disclosed methods comprise a methodology for detecting, attributing, and quantifying computing state transitions associated with a display device (e.g., display device of a device receiving a data communication(s)) within a dynamic, large-scale data environment within a computing platform on the computing device receiving the data communication(s).

The second data comprised in the output data can include a computationally synthesized and validated aggregate digital scalar value, representing one or more accretions of digitally transferable data considerations, which can be derived through the execution of operations executed on a computing device in response to receiving a data communication(s). In one embodiment, the operations comprise a multi-stage, distributed, and cryptographically secured data processing computing operation. The cryptographically secured data processing computing operations may be based on a continuous influx of heterogeneous, timestamped digital artifacts originating from similar or disparate interconnected data network nodes.

According to one embodiment, the disclosed methods and systems beneficially enable calibrating one or more computing models to overcome the disadvantages of data sparsity between a probability of executing a computing operation based on a data communication versus yield data associated with executing the computing operation by a stagewise training of one or more computing models to predict the first output data and/or second output data more accurately. This advantageously enables the doubly trained computing model to generate at least the first output data or the second output data referenced above and which are associated with one or more data communications (e.g., target data communications) to target computing systems. According to one embodiment, the disclosed first output data or second output data can facilitate improving or optimally and/or effectively configuring, tweaking, customizing, and/or delivering one or more data communications to one or more computing systems (e.g., target computing systems) there by enhancing the delivery of the delivery or rendering of the one or more data communications by about 50% or by about 60% or by about 70% or by about 80% or by about 90% or by about 95% relative to systems that lack mechanisms for generating the first output data and/or second output data.

According to one embodiment, the disclosed calibrated computing models can be based on a deep probabilistic system for yield (e.g., yield data) lifetime value prediction. In particular, the problem to be solved can be modeled as a multi-task learning problem where feature inputs are request data (e.g., request data associated with a target data communication) and communication category (e.g., communication category data), where: computing tasks are classifications indicating a likelihood of execution a computing operation; and a regression on yield data associated with executing said computing operation. In one embodiment, the yield data can be assumed to follow a lognormal distribution such that output data from the calibrated model can model our indicate probability data (e.g., p in the expression below) and one or more data parameters (e.g., μ and σ) in the expression below. The final yield data (e.g., E(y) in the expression below) can then be computationally characterized by the expression:

$$E(y) = p * \exp\left(\mu + \frac{\sigma^2}{2}\right).$$

In one embodiment, model training can be conducted in a two-stage manner based on training data comprising features or data elements from request data and a communication category. The first stage can focus on training the disclosed computing model to determine a probability of executing a computing operation while the second stage focuses on training the computing model to determine the yield part of the disclosed computing model. The final yield prediction can then be constructed based on the above expression.

According to one embodiment, one or more model evaluators comprising at least one loss function (e.g., a loss function based on a regression area under the curve (AUC)) computing process that not only considers classification loss and regression loss for positive data samples, but also the regression loss for negative data samples, thereby controlling or otherwise balancing unexpected large data predictions associated with the negative samples. In some cases, training the disclosed computing model involves a two-stage process that ensures results generated by a configured or calibrated computing model are stable.

With a given trained model, a model score may be generated for historical request data thereby adding a calibration layer for tuning the configured computing model to normalize output data from the calibrated computing model. This final model (e.g., calibrated computing model) may be used for real-time or near real time data predictions associated with subsequent request data. In one embodiment, the normalized output data generated using the calibrated computing model helps stabilize model prediction data distribution from day to day of using the calibrated computing model.

According to one embodiment, the calibrated computing model can be configured to predict an estimate value of a given request data. This prediction can serve as a yield factor in a communications optimization logic. In one embodiment, the yield factor can be used to scale the model prediction of the calibrated computing model and accordingly, be used to make the calibrated computing model more performant. One merit of this approach is that, after calibration, the scores or data values (e.g., data values in a multidimensional report) can have the same scale across multiple temporal windows (e.g., days, weeks, months, etc.) for each particular communication category. This avoids considerations of how to mitigate output data changes across multiple similar or dissimilar temporal windows. For example, the output data from the calibrated computing model can be based on a temporal window of 7 days for a specific communications category such that the output data may initially have a 25-percentile with attendant standard deviation values. For each specific category comprised in the communication category, the output data may be transformed into data values in a multidimensional report to ensure that the output data has a standard deviation of 1 and a percentile of 1. This forms part of the normalization mentioned above.

As indicated above, one or more model evaluators (e.g., computing model evaluators) may be used to test or balance a given generated trained model. In one embodiment, the one or more model evaluators comprises a regression AUC computing process that is determined by aggregating the number of correct data predictions of the data outputs or data predictions from a trained computing model. Suppose y is the true label, y' is the prediction, |y| is the number of samples. Then the regression AUC can be expressed as:

$$\text{score}(i, j) = \begin{cases} 1, & \text{if } (y_i - y_j)(y'_i - y'_j) > 0, \\ 0.5, & \text{if } y \neq y_j \text{ and } y'_i = y'_j, \\ 0, & \text{otherwise.} \end{cases}$$

$$\text{reg\_auc} = \frac{\sum_{\substack{i,j \in N \\ y_i \neq y_j}} \text{score}(i, j)}{\sum_{\substack{i,j \in N \\ y_i \neq y_j}} 1}$$

In some embodiment, a faster version of regression AUC may be used to avoid unnecessary calculations. In such scenarios, a knowledge agnostic way to calculate the data predictions can comprise iterating over all unique data sample pairs and compare said predictions, which will have a high computation complexity of about O (N^2). To avoid iteration over all pairs, the reg_auc referenced above can be decomposed into components that can be directly computed.

To calculate the denominator of reg_auc, a numpy.unique ( ) computing function may be used to find unique label values $\tilde{y}$ and their counts $c_{\tilde{y}}$.

To compute the number of sample pairs with a score or output data value of 0.5—that is, pairs with equal predictions but different labels, a similar approach can be leveraged. First, a numpy.unique( ) computing function may be used to find unique predictions y and their counts cy, such that the number of pairs with equal predictions can be obtained. However, this prediction might include pairs with equal labels, so there is a need to subtract the number of pairs with equal predictions and equal labels from it.

By finding the unique tuple of predictions and labels (y, y') and their value counts $c_{\tilde{y}}$, the number of pairs with equal predictions and equal labels can be obtained.

For the number of pairs with score=1, the expression would involve pairs where at least one sample's label is >0. Since the positive ratio in dataset can be pretty low, all positive samples may be iterated over, with the output data being compared to data values of other predictions to efficiently count the pairs where the condition for output data=1 is met using numpy.count_zeros( ) computing function.

Some benefits of the disclosed model training and calibration involves using a model evaluator that is a multi-objective loss function. This multi-objective loss function can balance the predictability between data predictions of a first computing model (e.g., which is a classification loss data predictions) and data predictions (e.g., regression loss data predictions) of a second computing model derived from the first computing model. In particular, the regression loss can be further broken down to consider true positives and false positives to better deal with imbalanced data distributions associated with request data.

According to one embodiment, the disclosed methods and systems apply a two-stage training mechanism of a given computing model to ensure stable training of the computing model. The first stage can comprise training a probability of computing operation execution part associated with the computing model. Following this, the trained model's parameters can be fixed while extra training layers with output coefficients that are based on a LogNorm distribution can be applied to train the trained model thereby generating a calibrated model that can generate yield data. In particular, the second stage tunes the extra layers added to the trained model resulting from the first stage. The final model prediction can then be reconstructed by considering both the computing operation execution and yield prediction.

In one embodiment, calibrating a configured computing model can beneficially ensure that output data generated by the calibrated computing model is normalized.

Figure 3:
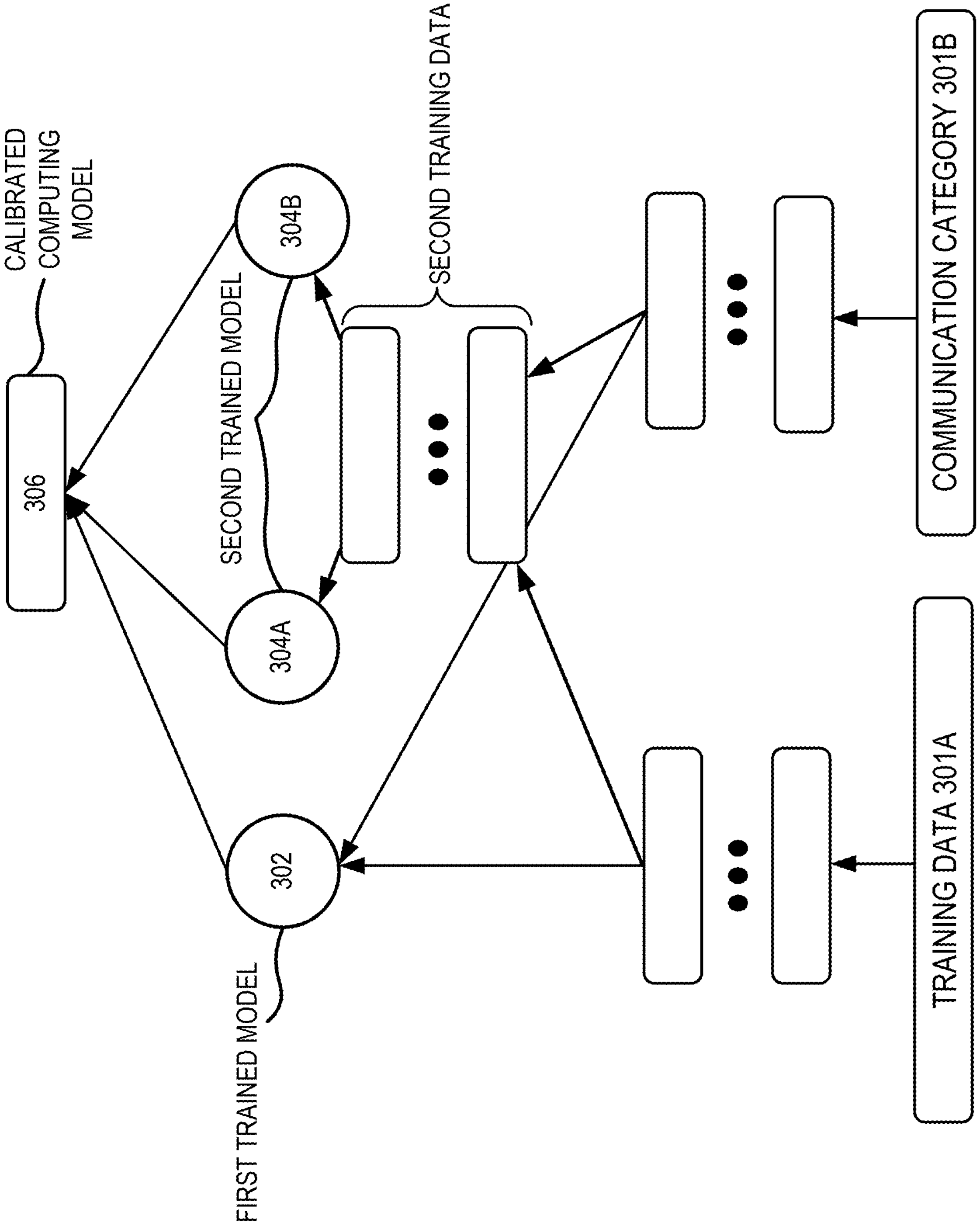
FIG. 3 shows a dual data tower indicating how one or more calibrated computing models can be generated.
Figure 4A:
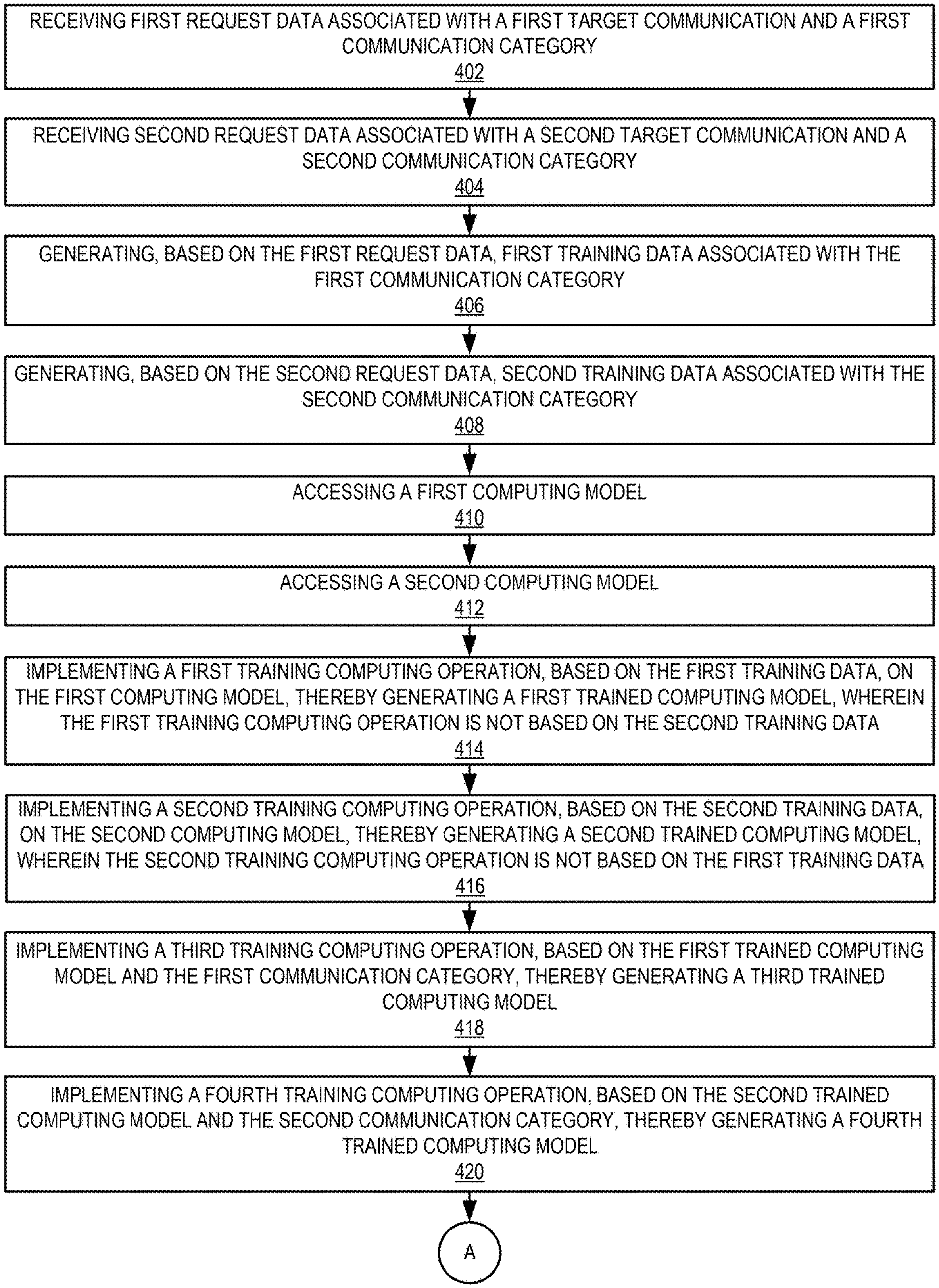
FIGS. 4A-4D show exemplary workflows for illustrates an additional exemplary workflow for generating computing output data for a target communication in a computing network.
Figure 4B:
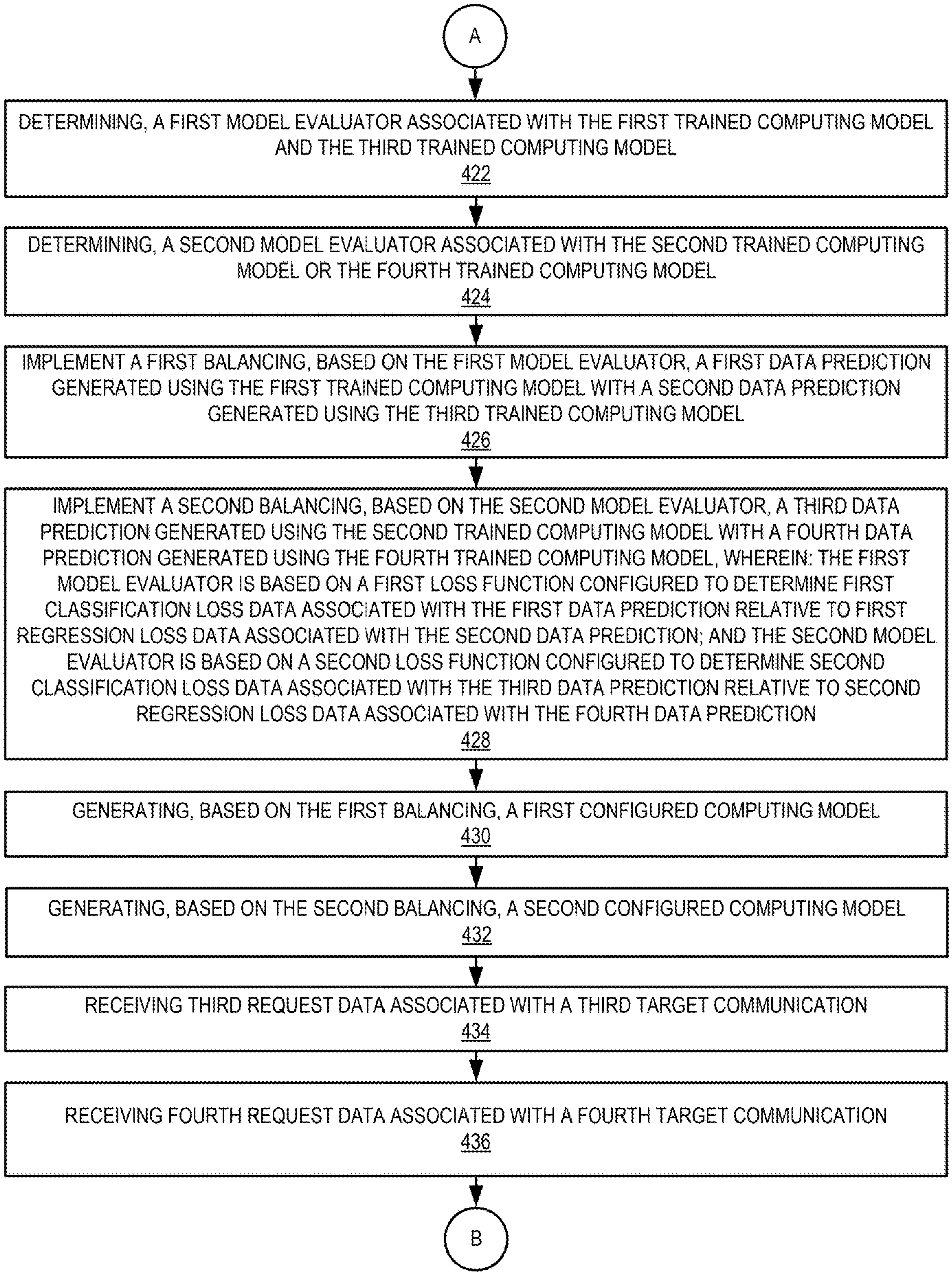
Figure 4C:
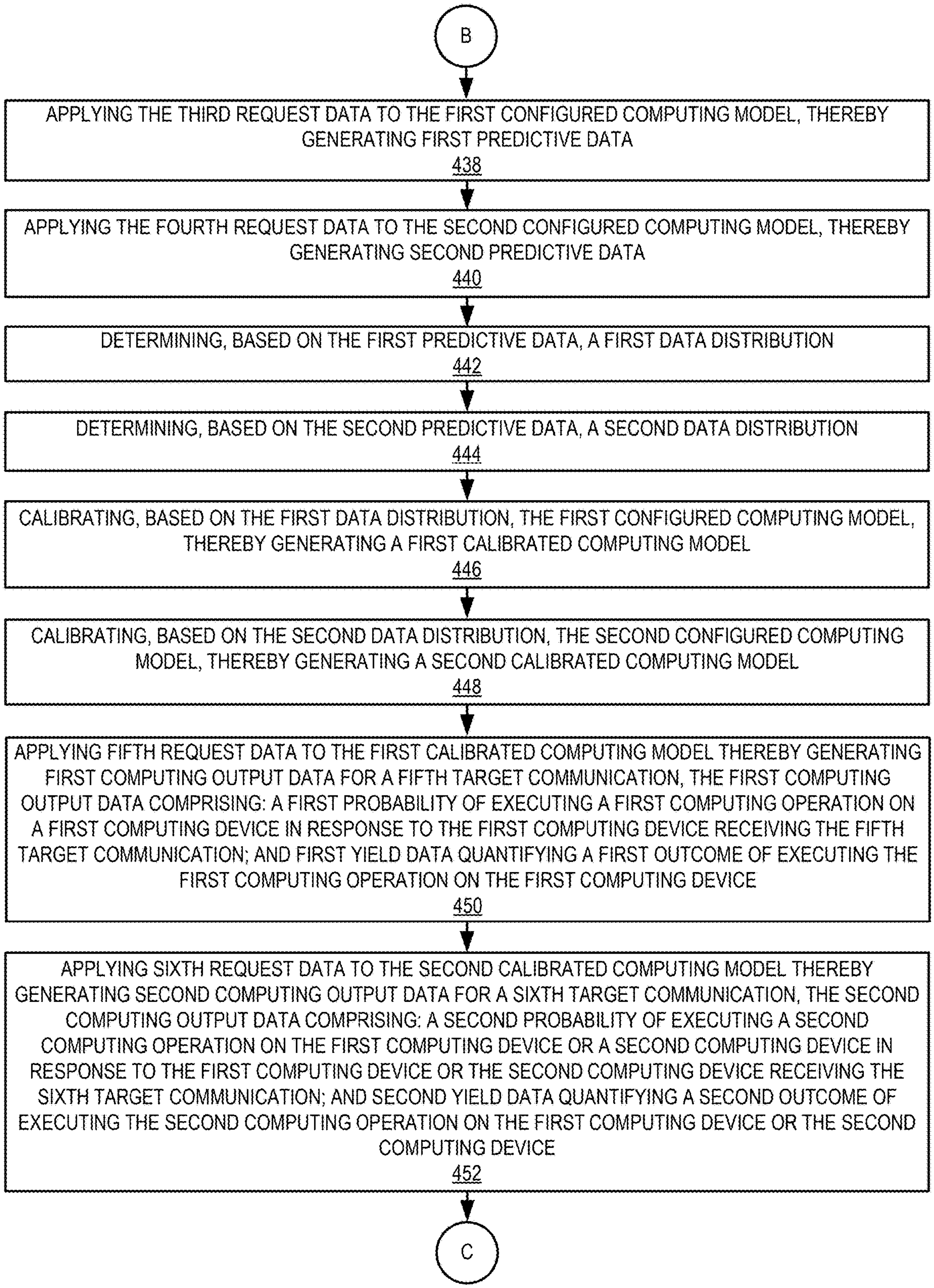
Figure 4D:
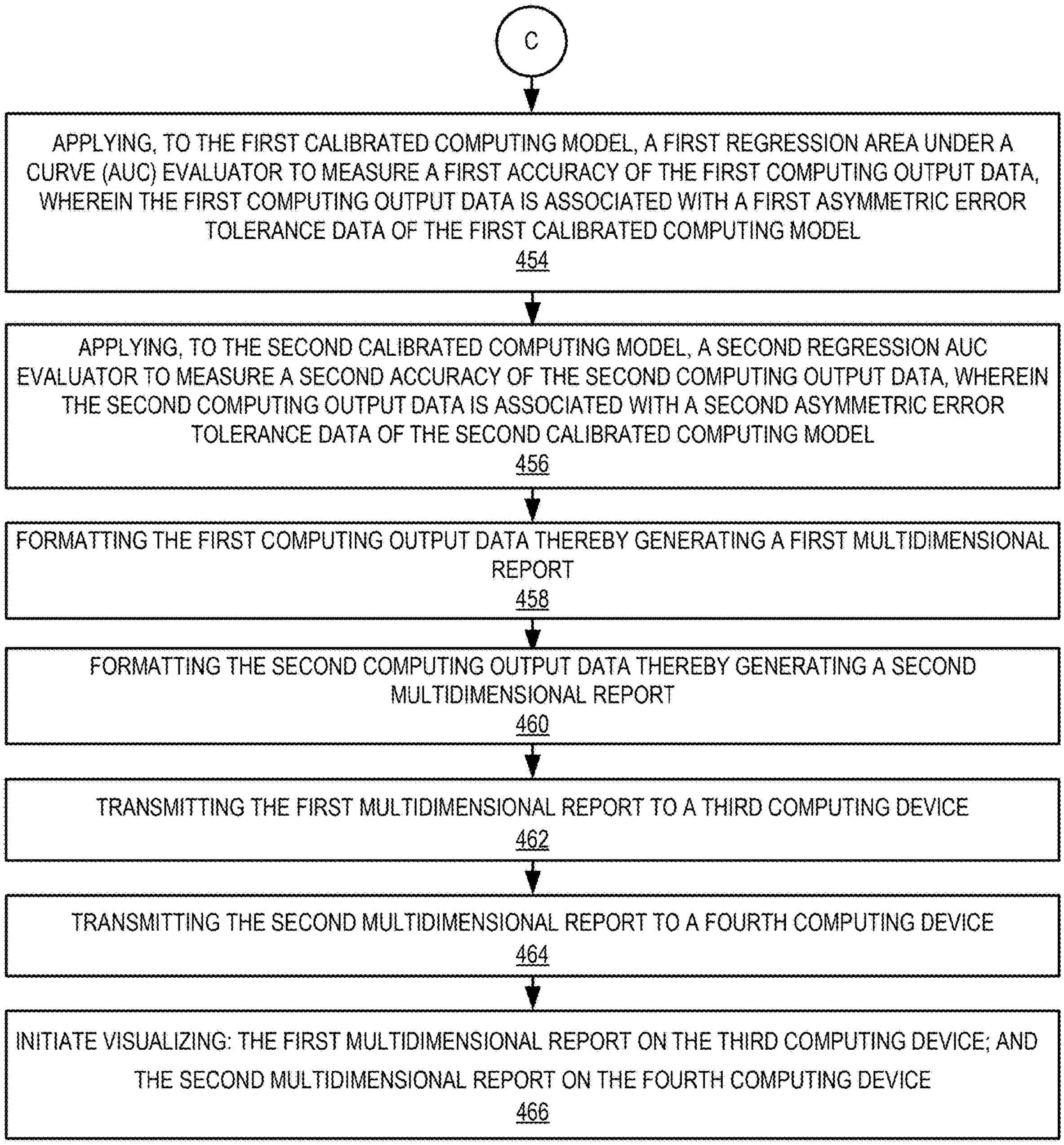

FIG. 3 shows a dual data tower indicating how one or more calibrated computing models can be generated. In particular, this dual data tower enables applying a multi-objective optimization process that enhances the accuracy of the data predictions generated by the disclosed calibrated models. According to one embodiment, a first data tower of the dual data tower may comprise generating training data 301A based on a given request data. As discussed in association with FIGS. 4A-4D, request data can comprise a defined schema including a data object that is configured as a technical input for initiating and constraining a real-time, distributed computational discovery mechanism for one or more target communications.

Turning back to FIG. 3, training data 301A in combination with communication category (e.g., communication category data) 301B are collaboratively used to generate a first trained computing model 302. As can be seen in this figure, the first trained computing model 302 can be used in combination with a second trained computing model (e.g., models 304A and 304B) derived from at least the communication category 301B to generate a calibrated computing model 306 that can be subsequently used to drive analytics surrounding data communication strategies. According to one embodiment, the calibrated computing model 306 can be beneficially used to generate a multidimensional report associated with a given request data. For example, the multidimensional report can comprise comprehensive performance insights (e.g., insight data) that aggregates data across various dimensions. In particular, this report can include, but is not limited to: a probability (e.g., probability data) of executing a computing operation on a given first computing device; and yield data associated with executing the computing operation on said first computing device or a second computing device. This enables a granular analysis of operational effectiveness. Specifically, the probability of executing a computing operation may encompass metrics such as computational resource utilization, successful process completions, and rates of successful operation segmented by parameters like data type, processing unit, device architecture, geographic location of the computing resource, and temporal intervals. Concurrently, the yield data associated with executing the computing operation can quantify the operational output from the request data, detailing aspects such as total output generated, resource consumption per operation, output efficiency, and operational throughput, similarly disaggregated across the aforementioned dimensions. This multidimensional structure facilitates the identification of optimal strategies, high-performing computational resources, and areas for operational optimization by revealing intricate relationships between various request data parameters and their resultant operational probabilities and associated yields. These aspects are further discussed in conjunction with FIGS. 4A-4D.

FIGS. 4A-4D show exemplary workflows for illustrates an exemplary workflow for training a learning model using segregated data to generate computing output data associated with a target communication in a computing network. One or more data engines, comprising control logic or applications stored in a non-transitory memory device, can enable the implementation of various stages within these workflow. The one or more data engines can operate independently or in conjunction with a data communication software tool for transmitting one or more target communications. Furthermore, segregated data as used herein can comprise specific data associated with a plurality of distinct data objects, each corresponding to specific communication provider systems. In effect, segregated data can comprise first request data with attendant first category data associated with a first data communication which is transmissible using a first communication provider system. Similarly, the segregated data can also comprise second request data with attendant second category data associated with a second data communication which is transmissible using a second communication provider system which is different from the first communication provider system. As further discussed below, a communication provider system can comprise a system configured to adjust, control, adapt, or otherwise develop a communications strategy for transmitting a target communication based on output data generated using the disclosed calibrated computing model.

At block 402, the one or more data engines may receive first request data associated with a first target communication and a first communication category. For example, the first communication category (and similarly, the second communication category discussed below) beneficially enables: reducing latency associated with matching data elements comprised in a given request data (e.g., data elements associated with the first request data or the second request data) to a given target communication; improving accuracy of said matching; and enabling a filtering methodology that enhances said matching. In one embodiment, the communication category comprises a semantic cluster identifier (SCID) assigned to a given request data. The SCID represents a specific centroid in a multidimensional feature space, enabling a given request data to be matched with user profiles or communications contexts located within a region of the same feature space, improving contextual relevance beyond simple keyword matching. This centroid can comprise a data point indicating attributes of data profiles to which a given target communication is sent. These attributes can include demographic data, location data, communication engagement data, etc.

At block 404 the one or more data engines may receive second request data associated with a second target communication and a second communication category. The second communication category can include features similar to, and/or distinct from, those described in association with the first communication category. In some embodiments, the first communication category is associated with a first communication provider system that is different from a second communication provider system with which the second communication category is associated.

According to one embodiment, the first request data or the second request data comprises a defined schema including a functional data object that serves as a technical input for initiating and constraining a real-time, distributed computational discovery mechanism for one or more target communications. In some embodiments, the first request data or the second request data comprises a serialized data object that can be encoded in a given file format (.e., JavaScript Object Notation (JSON) or a binary format (e.g., Protocol Buffers (Protobuf)) for transmission efficiency. Furthermore, the structure of the first request data or the second request data can be hierarchical, containing multiple nested data objects and parameter fields. Each parameter field of said data objects can provide a specific technical constraint or attribute that directly informs communication logic of a remote communication system. In some cases, each of the data objects can encapsulate necessary technical parameters of a given target communication into a single, transmissible unit.

Turning to block 406, the one or more data engines may generate, based on the first request data, first training data associated with the first communication category. Similarly, the one or more data engines may generate, based on the second request data, second training data associated with the second communication category.

At block 410, the one or more data engines may access a first computing model. The one or more data engines may also access a second computing model as shown at block 412. In one embodiment, the first computing model and/or the second computing model are associated with optimizing and/or improving and/or enhancing a communication strategy associated with a first communication provider system and/or a second communication provider system, and/or a third communication provider system.

Turning to block 414, the one or more data engines may implement a first training computing operation, based on the first training data, on the first computing model, thereby generating a first trained computing model, wherein the first training computing operation is not based on the second training data. Similarly, the one or more data engines may implement, at block 416, a second training computing operation, based on the second training data, on the second computing model, thereby generating a second trained computing model, such that the second training computing operation is not based on the first training data. In effect, the first training data may be associated with a first communication provider system while the second training data may be associated with a second communication provider system.

At block 418, the one or more data engines may implement a third training computing operation, based on the first trained computing model and the first communication category, thereby generating a third trained computing model. Similarly, the one or more data engines may also implement, at block 420, a fourth training computing operation, based on the second trained computing model and the second communication category, thereby generating a fourth trained computing model.

At block 422, the one or more data engines may determine a first model evaluator associated with the first trained computing model and the third trained computing model. The one or more data engines may also determine, at block 424, a second model evaluator associated with the second trained computing model or the fourth trained computing model. As further discussed below, the first model evaluator and/or the second model evaluator can comprise a metric and/or a computing function that enables balancing data outputs generated between: the first trained computing model and the third trained computing model; and the second trained computing model and the fourth trained computing model.

The one or more data engines may further implement, at block 426, a first balancing, based on the first model evaluator, a first data prediction generated using the first trained computing model with a second data prediction generated using the third trained computing model. For example, the first balancing can comprise a balancing computing operation (e.g., a computing operation associated with a multi-objective loss function representing the first model evaluator) that ensures data values of the first data prediction do not dominate, overcome, or unduly affect or warp the accuracy of data values of the second data prediction. In effect, this balancing can beneficially ensure that minimizing a loss in accuracy of the first data prediction does not come at the expense of significantly increasing a loss in accuracy of the second data prediction. Thus, the first balancing computing operation is a sophisticated computing operation that prevents accuracy of the first data prediction from overwhelming the accuracy of the second data prediction, leading to a more robust and harmonized overall predictive ability of the first trained computing model and the third computing model. According to one embodiment, the first balancing is based on a multi-objective optimization computing process implemented using the first model evaluator where neither the accuracy of the first data prediction nor the accuracy of the second data prediction is permitted to unduly dominate the other during the training of the first trained computing model or the third trained computing model. Without the first balancing, the first trained computing model may become exceptionally good at generating the first data predictions while the third trained computing model can be poor at estimating data values associated with the second data prediction. Without the first balancing, the third trained computing model may predict the second data prediction but only for a subset of data values relative to the first data prediction, thereby misclassifying low data values associated with the second data prediction. Thus, the first trained computing model is not merely making a first data prediction, but rather, data outputs from the first trained computing model and the third trained computing model are collaboratively analyzed to establish a cohesive, harmonized learning across two interdependent objectives (e.g., generating the first data prediction and the second data prediction). This balancing ensures that the first trained computing model in combination with the third trained computing model are holistically optimized for both the likelihood of a desired outcome (e.g., first data prediction) and an impact of that outcome (e.g., second data prediction), leading to a more effective data communication strategy associated with, for example, a first communication provider system.

Similarly, the one or more data engines may implement a second balancing, at block 428, based on the second model evaluator, a third data prediction generated using the second trained computing model with a fourth data prediction generated using the fourth trained computing model. For example, the second balancing can comprise a balancing computing operation (e.g., a computing operation associated with a multi-objective loss function representing the second model evaluator) that ensures data values of the third data prediction do not dominate, overcome, or unduly affect or warp the accuracy of data values of the fourth data prediction. In effect, this balancing can beneficially ensure that minimizing a loss in accuracy of the third data prediction does not come at the expense of significantly increasing a loss in accuracy of the fourth data prediction. Thus, the second balancing computing operation is a sophisticated computing operation that prevents accuracy of the third data prediction from overwhelming the accuracy of the fourth data prediction, leading to a more robust and harmonized overall predictive ability of the second trained computing model and the fourth trained computing model. Without the second balancing, the second trained computing model may become exceptionally good at generating the third data predictions while the fourth trained computing model can be poor at estimating data values associated with the fourth data prediction. Without the second balancing, the second trained computing model may predict the third data prediction but only for a subset of data values relative to the fourth data prediction, thereby misclassifying low data values associated with the fourth data prediction. Thus, the second trained computing model is not merely making a third data prediction, but rather, data outputs from the second trained computing model and the fourth trained computing model are collaboratively analyzed to establish a cohesive, harmonized learning across two interdependent objectives (e.g., generating the third data prediction and the fourth data prediction). This balancing ensures that the second trained computing model in combination with the fourth trained computing model are holistically optimized for both the likelihood of a desired outcome (e.g., the third data prediction) and an impact of that outcome (e.g., the fourth data prediction), leading to a more effective data communication strategy associated with, for example, a second communication provider system.

It is appreciated that the first model evaluator is based on a first loss function configured to determine first classification loss data associated with the first data prediction relative to first regression loss data associated with the second data prediction. It is further appreciated that the second model evaluator is based on a second loss function configured to determine second classification loss data associated with the third data prediction relative to second regression loss data associated with the fourth data prediction.

Turning to block 430, the one or more data engine may generate, based on the first balancing, a first configured computing model. The one or more data engines may also generate, at block 432, based on the second balancing, a second configured computing model. In effect, the first configured model and the second configured model are derived as a result of the balancing computing operations referenced above.

Turning to block 434, the one or more data engines may receive third request data associated with a third target communication. It is further appreciated that the one or more data engines may receive, at block 436, fourth request data associated with a fourth target communication. It is appreciated that the first request data, the second request data, the third request data, the fourth request data, etc., can have a data structure that is similar or dissimilar in nature.

At block 438, the one or more data engines may apply the third request data to the first configured computing model, thereby generating first predictive data. Similarly, the one or more data engines may apply, at block 440, the fourth request data to the second configured computing model, thereby generating second predictive data.

Turning to block 442, the one or more data engines may determine, based on the first predictive data, a first data distribution, and similarly, determine, based on the second predictive data, a second data distribution as shown at block 444.

At block 446, the one or more data engines may calibrate, based on the first data distribution, the first configured computing model, thereby generating a first calibrated computing model. The one or more data engines may also calibrate, at block 448, based on the second data distribution, the second configured computing model, thereby generating a second calibrated computing model.

Turning to block 450, the one or more data engines may apply, fifth request data to the first calibrated computing model thereby generating first computing output data for a fifth target communication. In one embodiment, the first computing output data comprises: a first probability of executing a first computing operation on a first computing device in response to the first computing device receiving the fifth target communication; and first yield data quantifying a first outcome of executing the first computing operation on the first computing device.

The one or more data engines may also apply, at block 452 sixth request data to the second calibrated computing model thereby generating second computing output data for a sixth target communication. For example, the second computing output data comprises: a second probability of executing a second computing operation on the first computing device or a second computing device in response to the first computing device or the second computing device receiving the sixth target communication; and second yield data quantifying a second outcome of executing the second computing operation on the first computing device or the second computing device.

At block 454, the one or more data engines may apply to the first calibrated computing model, a first regression area under a curve (AUC) evaluator to measure a first accuracy of the first computing output data, wherein the first computing output data is associated with a first asymmetric error tolerance data of the first calibrated computing model. In particular, the first asymmetric error tolerance data may be a result of applying the first model evaluator during the first balancing, which then affects the eventual data values of the first computing output data, such that the first regression AUC evaluator assesses, evaluates, or analyzes the first calibrated computing model and thereby generates a first holistic metric that represents or measures the performance of the first calibrated computing model in response to generating the first computing output data.

Similarly, the one or more data engines may apply, at block 456, to the second calibrated computing model a second regression AUC evaluator to measure a second accuracy of the second computing output data, wherein the second computing output data is associated with a second asymmetric error tolerance data of the second calibrated computing model. In particular, the second asymmetric error tolerance data may be a result of applying the second model evaluator during the second balancing, which then affects the eventual data values of the second computing output data, such that the second regression AUC evaluator assesses, evaluates, or analyzes the first calibrated computing model and thereby generates a first holistic metric that represents or measures the performance of the second calibrated computing model in response to generating the second computing output data.

At block 458, the one or more data engines format the first computing output data thereby generating a first multidimensional report. The one or more data engines can also format, at block 460, the second computing output data thereby generating a second multidimensional report.

According to one embodiment, the one or more data engines can transmit, at block 462, the first multidimensional report to a third computing device. Similarly, the one or more data engines may transmit, at block 464, the second multidimensional report to a fourth computing device. In addition, the one or more data engines may initiate visualizing, at block 466: the first multidimensional report on the third computing device; and the second multidimensional report on the fourth computing device.

In one embodiment, the first multidimensional report comprises data artifacts that indicate at least the first computing output data. In particular, the first multidimensional report comprises a digital document or data structure that representing a curated collection of data artifacts. These data artifacts can comprise various components, results, and intermediate data points that collectively represent the first computing output data generated by the first calibrated computing model. Furthermore, the first multidimensional report can be configured to serve as a digital record, or digital signature, of the first calibrated computing model, encompassing not only the final result (e.g., first computing output data) but also potentially the input parameters, intermediate calculations, and confidence data (e.g., scores) associated with data predictions made by the first calibrated computing model.

In a parallel fashion, the second multidimensional report functions as a similar record for computational predictions implemented using the second calibrated computing model. In particular, the second multidimensional report also contains data artifacts or indicia, which comprise data markers data or pointers associated with the second computing output data. Like the first multidimensional report, the second multidimensional report is directly linked to the second calibrated computing model. The second calibrated computing model has also undergone its own calibration process, using a different set of data or for similar or distinct purposes relative to the first calibrated computing model. The second multidimensional report's primary purpose is to capture and present at least the second computing output data. Specifically, the data artifacts of the second multidimensional report can comprise various components, results, and intermediate data points that collectively represent the second computing output data generated by the second calibrated computing model. Furthermore, the second multidimensional report can be configured to serve as a digital record, or digital signature, of the second calibrated computing model, encompassing not only the final result (e.g., second computing output data) but also potentially the input parameters, training data, intermediate calculations, and confidence data (e.g., scores) associated with data predictions made by the second calibrated computing model.

These and other implementations may each optionally include one or more of the following features.

According to one embodiment, generating the first training data comprises: transforming, using a hash computing operation and a modulus computing operation, a first data segment comprised in the first request data, thereby generating first transformed data; the generating the second training data comprises transforming, using a sine or cosine computing operation, a second data segment comprised in the first request data, thereby generating second transformed data; the first training data comprises a first combination of the first transformed data and the second transformed data; and the second training data comprises a second combination of the first transformed data and the second transformed data.

Furthermore, the first data segment comprises one or more of: a data format of the first target communication; platform data for a first target platform associated with the first computing device and through which the first target communication is delivered to the first computing device; device data for a device type associated with the first computing device; operating system data for an operating system type associated with the first computing device; media driver identifier data associated with the first request data; jurisdiction data associated with the first request data; zip code data associated with the first request data; communication language data associated with the first request data; rendering context data associated with the first request data; browser data associated with the first request data; communication connection type associated with the first request data; location data on a display device of the first computing device at which the first target communication is displayed; contextual communication group data associated with the first target communication; communication origination identifier data associated with the first target communication; communication identifier associated with the first target communication; and identifier data associated with the first communication category.

According to one embodiment, the second data segment is associated with, or comprises one or more of: timestamp data of a timestamp associated with when the first request data is received; temporal window data associated with a timeframe within which at least the first target communication or the sixth target communication is delivered to at least the first computing device; first time unit data associated with when at least the first target communication or the sixth target communication is transmitted or delivered to the first computing device; second time unit data associated with a frequency of transmitting at least the first target communication or the sixth target communication to the first computing device; and latitude or longitude data associated with a location of the first computing device. In some embodiments, the second data segment comprises third time unit data associated with a recurrence of transmitting at least the first target communication or the sixth target communication to the first computing device. The first time unit data or the second time unit data or the third time unit data or the temporal window data can comprise one of: a month, a week, a day, hours, minutes, or seconds.

Furthermore, the first model evaluator can be configured to determine by how much: the first trained computing model deviates in predicting substantially accurate data values; and the third trained computing model deviates in predicting substantially accurate data values. In making these determinations, ground truth values may be correlated or compared to the data predictions made using the first trained computing model and/or the third trained computing model. Moreover, the second model evaluator can be configured to determine by how much: the second trained computing model deviates in predicting substantially accurate data values; and the fourth trained computing model deviates in predicting substantially accurate data values. In making these determinations, ground truth values may be correlated or compared to the data predictions made using the second trained computing model and/or the fourth trained computing model.

It is appreciated that calibrating, based on the first data distribution, the first configured computing model, thereby generating the first calibrated computing model comprises tuning the first configured computing model to normalize first data outputs generated by the first calibrated computing model, thereby generating first normalized data outputs, the first normalized data outputs comprising the first computing output data. It is further appreciated that the calibrating, based on the second data distribution, the second configured computing model, thereby generating the second calibrated computing model comprises tuning the second configured computing model to normalize second data outputs generated by the second calibrated computing model, thereby generating second normalized data outputs, the second normalized data outputs comprising the second computing output data.

According to one embodiment, the first computing output data comprises a first quantitative data vector associated with: the first probability of executing the first computing operation on the first computing device in response to the first computing device receiving the fifth target communication; and the first yield data quantifying the first outcome of executing the first computing operation on the first computing device. Furthermore, the second computing output data comprises a second quantitative data vector associated with: the second probability of executing the second computing operation on the second computing device in response to the second computing device receiving the sixth target communication; and the second yield data quantifying the second outcome of executing the second computing operation on the second computing device.

In exemplary implementations, the fifth request data is associated with a first request for displaying the fifth target communication via a first computing platform associated with the first computing device or the second computing device; and the sixth request data is associated with a second request for displaying the sixth target communication via a second computing platform associated with the first computing device, the second computing device, or a fifth computing device.

Furthermore, the first target communication comprises one or more of first textual data, first image data, first video data, or first audio-visual data. Similarly the second target communication comprises one or more of second textual data, second image data, second video data, or second audio-visual data. In addition, the third target communication can comprise one or more of third textual data, third image data, third video data, or third audio-visual data. Moreover, the fourth target communication can comprise one or more of fourth textual data, fourth image data, fourth video data, or fourth audio-visual data. Furthermore, the fifth target communication can comprise one or more of fifth textual data, fifth image data, fifth video data, or fifth audio-visual data while the sixth target communication comprises one or more of sixth textual data, sixth image data, sixth video data, or sixth audio-visual data.

It is appreciated that the first computing platform comprises a first webpage while the second computing platform comprises a second webpage.

In some implementations: the first request data comprises a first data category to which the first target communication belongs; the second request data comprises a second data category to which the second target communication belongs; and the third request data comprises a third data category to which the third target communication belongs.

In some cases, the fifth target communication comprises a first technical artifact or a first computing process including a first textual graphic or a first image graphic or a first video graphic that can be rendered on the first computing device while the sixth target communication comprises a second technical artifact or a second computing process including a second textual graphic or a second image graphic or a second video graphic that can be rendered on the second computing device or a fifth computing device. The first target communication, the second target communication, and the third target communication can also have features corresponding to the fourth target communication or the fifth target communication.

According to one embodiment: the first computing output data comprises a first quantifiable measurement associated with at least the fifth target communication on at least the second computing device; and the second computing output data comprises a second quantifiable measurement associated with at least the sixth target communication on at least the second computing device.

Additionally, the first regression AUC evaluator is configured to determine first ordering data of the first calibrated computing model relative to a first validated data prediction associated with the first calibrated computing model. In particular, the first regression AUC evaluator can be configured to assess the first ordering data of the first calibrated computing model by determining how well the first calibrated computing model's output values (e.g., output values comprised in the first computing output data) are arranged or ordered relative to the first validated data prediction associated with that first calibrated computing model. In this instance, the first regression AUC evaluator can be used to measure the first calibrated computing model's capacity to properly sequence its predictions against the first validated data prediction. The first validated data prediction can indicate the first calibrated model's configurability to provide a close estimation of actual validated data values (e.g., ground truth data values or accurate data values), indicating the first calibrated computing model's predictive quality. This process ensures that the first calibrated computing model can not only generate close estimations to the actual validated data values but also properly order or sequence, based on the first ordering data, its data outputs.

Similarly, the second regression AUC evaluator is configured to determine second ordering data of the second calibrated computing model relative to a second validated data prediction associated with the second calibrated computing model. In particular, the second regression AUC evaluator can be configured to assess the second ordering data of the second calibrated computing model by determining how well the second calibrated computing model's output values (e.g., output values comprised in the second computing output data) are arranged or ordered relative to the second validated data prediction associated with that second calibrated computing model. In this instance, the second regression AUC evaluator can be used to measure the second calibrated computing model's capacity to properly sequence or arrange its predictions against the second validated data prediction. The second validated data prediction can indicate the second calibrated model's configurability to provide a close estimation of actual validated data values (e.g., ground truth data values or accurate data values), indicating the first calibrated computing model's predictive quality. This process ensures that the second calibrated computing model can not only generate close estimations to the actual validated data values but also properly order or sequence, based on the second ordering data, its data outputs.

According to one embodiment, the disclosed method enhances model performance (e.g., of a given calibrated computing model) and data privacy by isolating specific training data during model development and operation. This can be achieved by employing independent training data based on specific request data with attendant specific data categories of specific communication provider systems.

In effect, first training data may be generated for a first communication provider system based on request data associated with said first communication provider system and applied to a first computing model configured for the first communication provider system. The first computing model may undergo additional subsequent training to generate a calibrated computing model specifically customized for the first communication provider system. The first communication provider system can be configured to adjust, control, adapt, or otherwise develop a communications strategy for transmitting a first target communication based on first output data from the first calibrated computing model.

Similarly, second training data may be generated for a second communication provider system such that the second training data is different from the first training data and can be used to train a second computing model configured for a second communication provider system that is different from the first communication provider system. Doing so beneficially enables customized training of computing models for each communication provider system. The second communication provider system can be configured to adjust, control, adapt, or otherwise develop a communications strategy for transmitting a second target communication based on second output data from the second calibrated computing model.

It is appreciated that the first computing model and the second computing model are respectively trained to generate a first calibrated computing model and a second calibrated computing model for the first communication provider system and the second communication provider system, respectively. This principle can extend to multiple communication provider systems, where each system benefits from its own uniquely tailored training data and subsequent customized model calibration, generating corresponding output data to inform their respective communications strategies.

According to one embodiment, a calibrated computing model (similarly applicable to other computing models disclosed herein) can comprise various intelligent structures that predict the probability of executing a computing operation or yield data associated with same. In addition, the calibrated computing model can comprise, for example, one or more artificial neural networks, deep learning networks, or other machine learning processes, which are trained on extensive datasets encompassing interaction data, request data, and other historical performance metrics. In one embodiment, the intelligent structures are configured to analyze complex, non-linear relationships within datasets or training data, identifying patterns indicative of the first output data or the second output data referenced above.

In some cases, the intelligent structures within, for example, a calibrated computing model can process input data (e.g., request data and/or communication category). Through iterative learning and refinement, a calibrated model can continuously adjust its internal parameters to enhance the accuracy of both the first and/or second output data. According to one embodiment, the analytics server 110*a* referenced in conjunction with FIG. 1 can collaboratively communicate with an intelligence model server configured to control or regulate training of one or more of the disclosed computing models such as the calibrated computing model. In some instances, the intelligence model server can train a given model using at least one of: zero-shot learning, few-shot learning, and fine-tuning. Additionally or alternatively, one or more of the disclosed models may comprise, or be based on at least one of: GPT-4, LLAMA-3, BLOOM, PaLM, GPT-3.5, BERT, Gemini, LaMDA, Perplexity, Falcon, or any other intelligence model. Additionally or alternatively, one or more of the disclosed models may also include multiple intelligence models (e.g., separately trained intelligence models) and therefore may be configured to perform and/or execute multiple processes in parallel.

The increasing complexity of modern computational environments necessitates robust mechanisms for analyzing and optimizing diverse operations. As systems process vast amounts of request data and execute a multitude of computing operations, understanding their performance (e.g., computing operation execution performance) characteristics becomes paramount. Some reporting methods often provide a limited, one-dimensional view, failing to capture the intricate interdependencies between various input parameters, operational attributes, and resulting outcomes. This limited visibility hinders effective decision-making, making it challenging to identify bottlenecks, optimize resource allocation, and enhance overall system efficiency.

There is, therefore, a need for a comprehensive analytical tool that can aggregate and present computing operational insights across multiple dimensions. In particular, there is a need for a tool that enables precisely determining a probability of executing a computing operation under specific conditions and to accurately quantify the associated yield data, leading to more informed strategic adjustments and improved operational effectiveness. Without such multidimensional reporting capabilities, there is a risk of suboptimal digital performance, inefficient resource utilization, and an inability to computationally adapt rapidly to evolving computational demands.

It is appreciated that the term optimize/optimal and its variants (e.g., efficient or optimally) may simply indicate improving, rather than the ultimate form of 'perfection' or the like.

The terminology used in this disclosure is for the purpose of describing particular exemplary embodiments and is not intended to be limiting. For example, as used herein, the singular forms "a", "an" and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer or section from another element, component, region, layer or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claims.

What is claimed is:

1. A method of training a learning model using segregated data to generate computing output data associated with a target communication in a computing network, the method comprising:

receiving, using one or more computing device processors, first request data associated with a first target communication and a first communication category;

receiving, using the one or more computing device processors, second request data associated with a second target communication and a second communication category;

generating, using the one or more computing device processors, based on the first request data, first training data associated with the first communication category;

generating, using the one or more computing device processors, based on the second request data, second training data associated with the second communication category;

accessing, using the one or more computing device processors, a first computing model;

accessing, using the one or more computing device processors, a second computing model;

implementing a first training computing operation, using the one or more computing device processors and based on the first training data, on the first computing model, thereby generating a first trained computing model, wherein the first training computing operation is not based on the second training data;

implementing a second training computing operation, using the one or more computing device processors and based on the second training data, on the second computing model, thereby generating a second trained computing model, wherein the second training computing operation is not based on the first training data;

implementing a third training computing operation, using the one or more computing device processors and based on the first trained computing model and the first communication category, thereby generating a third trained computing model;

implementing a fourth training computing operation, using the one or more computing device processors and based on the second trained computing model and the second communication category, thereby generating a fourth trained computing model;

determining, using the one or more computing device processors, a first model evaluator associated with the first trained computing model and the third trained computing model;

determining, using the one or more computing device processors, a second model evaluator associated with the second trained computing model or the fourth trained computing model;

first balancing, using the one or more computing device processors and based on the first model evaluator, a first data prediction generated using the first trained computing model with a second data prediction generated using the third trained computing model;

second balancing, using the one or more computing device processors and based on the second model evaluator, a third data prediction generated using the second trained computing model with a fourth data prediction generated using the fourth trained computing model, wherein:

- the first model evaluator is based on a first loss function configured to determine first classification loss data associated with the first data prediction relative to first regression loss data associated with the second data prediction, and
- the second model evaluator is based on a second loss function configured to determine second classification loss data associated with the third data prediction relative to second regression loss data associated with the fourth data prediction;

generating, using the one or more computing device processors and based on the first balancing, a first configured computing model;

generating, using the one or more computing device processors and based on the second balancing, a second configured computing model;

receiving, using the one or more computing device processors, third request data associated with a third target communication;

receiving, using the one or more computing device processors, fourth request data associated with a fourth target communication;

applying, using the one or more computing device processors, the third request data to the first configured computing model, thereby generating first predictive data;

applying, using the one or more computing device processors, the fourth request data to the second configured computing model, thereby generating second predictive data;

determining, using the one or more computing device processors and based on the first predictive data, a first data distribution;

determining, using the one or more computing device processors and based on the second predictive data, a second data distribution;

calibrating, using the one or more computing device processors and based on the first data distribution, the first configured computing model, thereby generating a first calibrated computing model;

calibrating, using the one or more computing device processors and based on the second data distribution, the second configured computing model, thereby generating a second calibrated computing model;

applying, using the one or more computing device processors, fifth request data to the first calibrated computing model thereby generating, in real-time, first computing output data for a fifth target communication, wherein the fifth target communication comprises a first technical artifact, wherein the first computing output data comprises:

- a first probability of executing a first computing operation on a first computing device in response to the first computing device receiving the fifth target communication, wherein the first computing operation comprises a first interaction with the first technical artifact, and
- first yield data quantifying a first outcome of executing the first computing operation on the first computing device, wherein the first yield data comprises a first value generated by the first interaction with the first technical artifact;

applying, using the one or more computing device processors, sixth request data to the second calibrated computing model thereby generating, in real-time, second computing output data for a sixth target communication, wherein the sixth target communication comprises a second technical artifact, wherein the second computing output data comprises:

- a second probability of executing a second computing operation on the first computing device or a second computing device in response to the first computing device or the second computing device receiving the sixth target communication, wherein the second computing operation comprises a second interaction with the second technical artifact, and
- second yield data quantifying a second outcome of executing the second computing operation on the first computing device or the second computing device, wherein the second yield data comprises a second value generated by the second interaction with the second technical artifact;

applying, to the first calibrated computing model, using the one or more computing device processors, a first regression area under a curve (AUC) evaluator to measure a first accuracy of the first computing output data, wherein the first computing output data is associated with a first asymmetric error tolerance data of the first calibrated computing model;

applying, to the second calibrated computing model, using the one or more computing device processors, a second regression AUC evaluator to measure a second accuracy of the second computing output data, wherein the second computing output data is associated with a second asymmetric error tolerance data of the second calibrated computing model;

formatting, using the one or more computing device processors, the first computing output data thereby generating a first multidimensional report;

formatting, using the one or more computing device processors, the second computing output data thereby generating a second multidimensional report;

transmitting, using the one or more computing device processors, the first multidimensional report to a third computing device;

transmitting, using the one or more computing device processors, the second multidimensional report to a fourth computing device; and initiating visualization of, using the one or more computing device processors:

the first multidimensional report on the third computing device, and the second multidimensional report on the fourth computing device.

2. The method of claim 1, wherein:

the generating the first training data comprises transforming, using a hash computing operation and a modulus computing operation, a first data segment comprised in the first request data, thereby generating first transformed data, the generating the second training data comprises transforming, using a sine or cosine computing operation, a second data segment comprised in the first request data, thereby generating second transformed data, the first training data comprises a first combination of the first transformed data and the second transformed data, and the second training data comprises a second combination of the first transformed data and the second transformed data.

3. The method of claim 2, wherein the first data segment comprises one or more of:

a data format of the first target communication, platform data for a first target platform associated with the first computing device and through which the first target communication is delivered to the first computing device, device data for a device type associated with the first computing device, operating system data for an operating system type associated with the first computing device, media driver identifier data associated with the first request data, jurisdiction data associated with the first request data, zip code data associated with the first request data, communication language data associated with the first request data, rendering context data associated with the first request data, browser data associated with the first request data, communication connection type associated with the first request data, location data on a display device of the first computing device at which the first target communication is displayed, contextual communication group data associated with the first target communication, communication origination identifier data associated with the first target communication, communication identifier associated with the first target communication, and identifier data associated with the first communication category.

4. The method of claim 2, wherein the second data segment is associated with or comprises one or more of:

timestamp data of a timestamp associated with when the first request data is received, temporal window data associated with a timeframe within which at least the first target communication or the sixth target communication is delivered to at least the first computing device, first time unit data associated with when at least the first target communication or the sixth target communication is transmitted or delivered to the first computing device, second time unit data associated with a frequency of transmitting at least the first target communication or the sixth target communication to the first computing device, and latitude or longitude data associated with a location of the first computing device.

5. The method of claim 1, wherein:

the first model evaluator determines by how much:

the first trained computing model deviates in predicting substantially accurate data values, and the third trained computing model deviates in predicting substantially accurate data values, and the second model evaluator determines by how much:

the second trained computing model deviates in predicting substantially accurate data values, and the fourth trained computing model deviates in predicting substantially accurate data values.

6. The method of claim 1, wherein:

the calibrating, based on the first data distribution, the first configured computing model, thereby generating the first calibrated computing model comprises tuning the first configured computing model to normalize first data outputs generated by the first calibrated computing model, thereby generating first normalized data outputs, the first normalized data outputs comprising the first computing output data, and the calibrating, based on the second data distribution, the second configured computing model, thereby generating the second calibrated computing model comprises tuning the second configured computing model to normalize second data outputs generated by the second calibrated computing model, thereby generating second normalized data outputs, the second normalized data outputs comprising the second computing output data.

7. The method of claim 1, wherein:

the first computing output data comprises a first quantitative data vector associated with:

the first probability of executing the first computing operation on the first computing device in response to the first computing device receiving the fifth target communication, and the first yield data quantifying the first outcome of executing the first computing operation on the first computing device, and the second computing output data comprises a second quantitative data vector associated with:

the second probability of executing the second computing operation on the second computing device in response to the second computing device receiving the sixth target communication, and the second yield data quantifying the second outcome of executing the second computing operation on the second computing device.

8. The method of claim 1, wherein:

the fifth request data is associated with a first request for displaying the fifth target communication via a first computing platform associated with the first computing device or the second computing device, and the sixth request data is associated with a second request for displaying the sixth target communication via a second computing platform associated with the first computing device, the second computing device, or a fifth computing device.

9. The method of claim 8, wherein:

the first target communication comprises one or more of first textual data, first image data, first video data, or first audio-visual data, the second target communication comprises one or more of second textual data, second image data, second video data, or second audio-visual data, the third target communication comprises one or more of third textual data, third image data, third video data, or third audio-visual data, the fourth target communication comprises one or more of fourth textual data, fourth image data, fourth video data, or fourth audio-visual data, the fifth target communication comprises one or more of fifth textual data, fifth image data, fifth video data, or fifth audio-visual data, and the sixth target communication comprises one or more of sixth textual data, sixth image data, sixth video data, or sixth audio-visual data.

10. The method of claim 8, wherein:

the first computing platform comprises a first webpage, and the second computing platform comprises a second webpage.

11. The method of claim 1, wherein:

the first request data comprises a first data category to which the first target communication belongs, the second request data comprises a second data category to which the second target communication belongs, and the third request data comprises a third data category to which the third target communication belongs.

12. The method of claim 1, wherein:

the fifth target communication comprises a first computing process including a first textual graphic or a first image graphic or a first video graphic that can be rendered on the first computing device, and the sixth target communication comprises a second computing process including a second textual graphic or a second image graphic or a second video graphic that can be rendered on the second computing device or a fifth computing device.

13. The method of claim 12, wherein:

the first computing output data comprises a first quantifiable measurement associated with at least the fifth target communication on at least the second computing device, and the second computing output data comprises a second quantifiable measurement associated with at least the sixth target communication on at least the second computing device.

14. The method of claim 1, wherein:

the first regression AUC evaluator determines first ordering data of the first calibrated computing model relative to a first validated data prediction associated with the first calibrated computing model, and the second regression AUC evaluator determines second ordering data of the second calibrated computing model relative to a second validated data prediction associated with the second calibrated computing model.

15. A system for training a learning model using segregated data to generate computing output data associated with a target communication in a computing network, the system comprising one or more hardware computing system processors and at least one memory storing instructions, that when executed by the one or more hardware computing system processors causes the one or more hardware computing system processors to:

receive first request data associated with a first target communication and a first communication category;

receive second request data associated with a second target communication and a second communication category;

generate, based on the first request data, first training data associated with the first communication category;

generate, based on the second request data, second training data associated with the second communication category;

access a first computing model;

access a second computing model;

implement a first training computing operation, based on the first training data, on the first computing model, thereby generating a first trained computing model, wherein the first training computing operation is not based on the second training data;

implement a second training computing operation, based on the second training data, on the second computing model, thereby generating a second trained computing model, wherein the second training computing operation is not based on the first training data;

implement a third training computing operation, based on the first trained computing model and the first communication category, thereby generating a third trained computing model;

implement a fourth training computing operation, based on the second trained computing model and the second communication category, thereby generating a fourth trained computing model;

determine a first model evaluator associated with the first trained computing model and the third trained computing model;

determine, a second model evaluator associated with the second trained computing model or the fourth trained computing model;

first balance, based on the first model evaluator, a first data prediction generated using the first trained computing model with a second data prediction generated using the third trained computing model;

second balance, based on the second model evaluator, a third data prediction generated using the second trained computing model with a fourth data prediction generated using the fourth trained computing model, wherein:

the first model evaluator is based on a first loss function configured to determine first classification loss data associated with the first data prediction relative to first regression loss data associated with the second data prediction, and the second model evaluator is based on a second loss function configured to determine second classification loss data associated with the third data prediction relative to second regression loss data associated with the fourth data prediction;

generate, based on the first balancing, a first configured computing model;

generate, based on the second balancing, a second configured computing model;

receive third request data associated with a third target communication;

receive fourth request data associated with a fourth target communication;

apply the third request data to the first configured computing model, thereby generating first predictive data;

apply the fourth request data to the second configured computing model, thereby generating second predictive data;

determine, based on the first predictive data, a first data distribution;

determine, based on the second predictive data, a second data distribution;

calibrate, based on the first data distribution, the first configured computing model, thereby generating a first calibrated computing model;

calibrate, based on the second data distribution, the second configured computing model, thereby generating a second calibrated computing model;

apply fifth request data to the first calibrated computing model thereby generating, in real-time, first computing output data for a fifth target communication, wherein the fifth target communication comprises a first technical artifact, wherein the first computing output data comprises:

a first probability of executing a first computing operation on a first computing device in response to the first computing device receiving the fifth target communication, wherein the first computing operation comprises a first interaction with the first technical artifact, and first yield data quantifying a first outcome of executing the first computing operation on the first computing device, wherein the first yield data comprises a first value generated by the first interaction with the first technical artifact;

apply sixth request data to the second calibrated computing model thereby generating, in real-time, second computing output data for a sixth target communication, wherein the sixth target communication comprises a second technical artifact, wherein the second computing output data comprises:

a second probability of executing a second computing operation on the first computing device or a second computing device in response to the first computing device or the second computing device receiving the sixth target communication, wherein the second computing operation comprises a second interaction with the second technical artifact, and second yield data quantifying a second outcome of executing the second computing operation on the first computing device or the second computing device, wherein the second yield data comprises a second value generated by the second interaction with the second technical artifact;

apply, to the first calibrated computing model a first regression area under a curve (AUC) evaluator to measure a first accuracy of the first computing output data, wherein the first computing output data is associated with a first asymmetric error tolerance data of the first calibrated computing model;

apply, to the second calibrated computing model, a second regression AUC evaluator to measure a second accuracy of the second computing output data, wherein the second computing output data is associated with a second asymmetric error tolerance data of the second calibrated computing model;

format the first computing output data thereby generating a first multidimensional report;

format the second computing output data thereby generating a second multidimensional report;

transmit the first multidimensional report to a third computing device;

transmit the second multidimensional report to a fourth computing device; and initiate visualization of:

the first multidimensional report on the third computing device, and the second multidimensional report on the fourth computing device.

16. The system of claim 15, wherein:

the generating the first training data comprises transforming, using a hash computing operation and a modulus computing operation (Hashmod), a first data segment comprised in the first request data, thereby generating first transformed data, the generating the second training data comprises transforming, using a sine or cosine computing operation, a second data segment comprised in the first request data, thereby generating second transformed data, the first training data comprises a first combination of the first transformed data and the second transformed data, and the second training data comprises a second combination of the first transformed data and the second transformed data.

17. The system of claim 16, wherein the first data segment comprises one or more of:

a data format of the first target communication, platform data for a first target platform associated with the first computing device and through which the first target communication is delivered to the first computing device, device data for a device type associated with the first computing device, operating system data for an operating system type associated with the first computing device, media driver identifier data associated with the first request data, jurisdiction data associated with the first request data, zip code data associated with the first request data, communication language data associated with the first request data, rendering context data associated with the first request data, browser data associated with the first request data, communication connection type associated with the first request data, location data on a display device of the first computing device at which the first target communication is displayed, contextual communication group data associated with the first target communication, communication origination identifier data associated with the first target communication, communication identifier associated with the first target communication, and identifier data associated with the first communication category.

18. The system of claim 16, wherein the second data segment is associated with or comprises one or more of:

timestamp data of a timestamp associated with when the first request data is received, temporal window data associated with a timeframe within which at least the first target communication or the sixth target communication is delivered to at least the first computing device, first time unit data associated with when at least the first target communication or the sixth target communication is transmitted or delivered to the first computing device, second time unit data associated with a frequency of transmitting at least the first target communication or the sixth target communication to the first computing device, and latitude or longitude data associated with a location of the first computing device.

19. The system of claim 15, wherein:

the first target communication comprises one or more of first textual data, first image data, first video data, or first audio-visual data, the second target communication comprises one or more of second textual data, second image data, second video data, or second audio-visual data, the third target communication comprises one or more of third textual data, third image data, third video data, or third audio-visual data, the fourth target communication comprises one or more of fourth textual data, fourth image data, fourth video data, or fourth audio-visual data, the fifth target communication comprises one or more of fifth textual data, fifth image data, fifth video data, or fifth audio-visual data, and the sixth target communication comprises one or more of sixth textual data, sixth image data, sixth video data, or sixth audio-visual data.

20. The system of claim 15, wherein:

the first computing output data comprises a first quantitative data vector associated with:

the first probability of executing the first computing operation on the first computing device in response to the first computing device receiving the fifth target communication, and the first yield data quantifying the first outcome of executing the first computing operation on the first computing device, and the second computing output data comprises a second quantitative data vector associated with:

the second probability of executing the second computing operation on the second computing device in response to the second computing device receiving the sixth target communication, and the second yield data quantifying the second outcome of executing the second computing operation on the second computing device.

* * * * *